United States Patent
Corbin

(10) Patent No.: US 6,619,863 B2
(45) Date of Patent: Sep. 16, 2003

(54) METHOD AND SYSTEM FOR CAPTURING FILM IMAGES

(75) Inventor: Douglas E. Corbin, Austin, TX (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/774,544

(22) Filed: Jan. 31, 2001

(65) Prior Publication Data

US 2001/0041075 A1 Nov. 15, 2001

Related U.S. Application Data

(60) Provisional application No. 60/180,477, filed on Feb. 3, 2000.

(51) Int. Cl.$^7$ .............................. G03D 5/00
(52) U.S. Cl. .......................... 396/604; 396/626
(58) Field of Search ................ 396/604, 626, 396/599, 617, 620; 430/21, 30

(56) References Cited

U.S. PATENT DOCUMENTS

| | | | |
|---|---|---|---|
| 2,404,138 A | 7/1946 | Mayer | 95/94 |
| 3,520,689 A | 7/1970 | Nagae et al. | 96/55 |
| 3,520,690 A | 7/1970 | Nagae et al. | 96/55 |
| 3,587,435 A | 6/1971 | Chioffe | 95/89 |
| 3,615,479 A | 10/1971 | Kohler et al. | 96/48 |
| 3,615,498 A | 10/1971 | Aral | 96/55 |
| 3,617,282 A | 11/1971 | Bard | 96/59 |
| 3,747,120 A | 7/1973 | Stemme | 346/75 |
| 3,833,161 A | 9/1974 | Krumbein | 226/92 |
| 3,903,541 A | 9/1975 | Von Meister et al. | 354/317 |
| 3,946,398 A | 3/1976 | Kyser et al. | 346/1 |
| 3,959,048 A | 5/1976 | Stanfield et al. | 156/94 |
| 4,026,756 A | 5/1977 | Stanfield et al. | 156/554 |
| 4,081,577 A | 3/1978 | Horner | 427/424 |
| 4,142,107 A | 2/1979 | Hatzakis et al. | 250/571 |
| 4,215,927 A | 8/1980 | Grant et al. | 354/317 |
| 4,249,985 A | 2/1981 | Stanfield | 156/554 |
| 4,265,545 A | 5/1981 | Slaker | 356/431 |
| 4,301,469 A | 11/1981 | Modeen et al. | 358/75 |
| 4,490,729 A | 12/1984 | Clark et al. | 346/75 |
| 4,501,480 A | 2/1985 | Matsui et al. | 354/298 |

(List continued on next page.)

FOREIGN PATENT DOCUMENTS

| | | | |
|---|---|---|---|
| EP | 0 261 782 A2 | 8/1987 | H04N/1/46 |
| EP | 0 422 220 A1 | 3/1989 | A61B/6/03 |
| EP | 0 482 790 B1 | 9/1991 | H04N/1/40 |

(List continued on next page.)

OTHER PUBLICATIONS

"Adaptive Fourier Threshold Filtering: A Method to Reduce Noise and Incoherent Artifacts in High Resolution Cardiac Images", Doyle, M., et al., 8306 Magnetic Resonance in Medicine 31, No. 5, Baltimore, MD, May, pp. 546–550, 1994.

(List continued on next page.)

Primary Examiner—D Rutledge
(74) Attorney, Agent, or Firm—Raymond M. Galasso; Simon, Galasso & Frantz PLC

(57) ABSTRACT

A monobath solution is coated onto undeveloped film to produce a developed image within the film. The coated film is scanned to produce an electronic representation of the developed image. The electronic representation can be output to a output device, such as a printer, memory storage device, data network, or the Internet. The monobath solution comprises a combination of a developing agent and some other processing function. For example, the monobath solution may comprise a combination of a developing agent and a fixing agent, bleaching agent, or stabilizing agent. The developed image generally comprises developed in-situ silver and at least one dye.

33 Claims, 2 Drawing Sheets

U.S. PATENT DOCUMENTS

| | | | | |
|---|---|---|---|---|
| 4,564,280 A | 1/1986 | Fukuda | | 354/317 |
| 4,594,598 A | 6/1986 | Iwagami | | 346/140 |
| 4,621,037 A | 11/1986 | Kanda et al. | | 430/30 |
| 4,623,236 A | 11/1986 | Stella | | 354/318 |
| 4,633,300 A | 12/1986 | Sakai | | 358/41 |
| 4,636,808 A | 1/1987 | Herron | | 346/75 |
| 4,666,307 A | 5/1987 | Matsumoto et al. | | 356/404 |
| 4,670,779 A | 6/1987 | Nagano | | 358/75 |
| 4,736,221 A | 4/1988 | Shidara | | 354/317 |
| 4,741,621 A | 5/1988 | Taft et al. | | 356/376 |
| 4,745,040 A | 5/1988 | Levine | | 430/21 |
| 4,755,844 A | 7/1988 | Tsuchiya et al. | | 354/317 |
| 4,777,102 A | 10/1988 | Levine | | 430/21 |
| 4,796,061 A | 1/1989 | Ikeda et al. | | 355/73 |
| 4,814,630 A | 3/1989 | Lim | | 250/578 |
| 4,821,114 A | 4/1989 | Gebhardt | | 358/75 |
| 4,845,551 A | 7/1989 | Matsumoto | | 358/80 |
| 4,851,311 A | 7/1989 | Millis et al. | | 430/30 |
| 4,857,430 A | 8/1989 | Millis et al. | | 430/30 |
| 4,875,067 A | 10/1989 | Kanzaki et al. | | 354/325 |
| 4,969,045 A | 11/1990 | Haruki et al. | | 358/228 |
| 4,994,918 A | 2/1991 | Lingemann | | 358/214 |
| 5,027,146 A | 6/1991 | Manico et al. | | 354/299 |
| 5,034,767 A | 7/1991 | Netz et al. | | 354/317 |
| 5,101,286 A | 3/1992 | Patton | | 358/487 |
| 5,124,216 A | 6/1992 | Giapis et al. | | 430/30 |
| 5,155,596 A | 10/1992 | Kurtz et al. | | 358/214 |
| 5,196,285 A | 3/1993 | Thomson | | 430/30 |
| 5,200,817 A | 4/1993 | Birnbaum | | 358/80 |
| 5,212,512 A | 5/1993 | Shiota | | 354/319 |
| 5,231,439 A | 7/1993 | Takahashi et al. | | 354/313 |
| 5,235,352 A | 8/1993 | Pies et al. | | 346/140 |
| 5,255,408 A | 10/1993 | Blackman | | 15/308 |
| 5,266,805 A | 11/1993 | Edgar | | 250/330 |
| 5,267,030 A | 11/1993 | Giorgianni et al. | | 358/527 |
| 5,292,605 A | 3/1994 | Thomson | | 430/30 |
| 5,296,923 A | 3/1994 | Hung | | 358/527 |
| 5,334,247 A | 8/1994 | Columbus et al. | | 118/411 |
| 5,350,651 A | 9/1994 | Evans et al. | | 430/21 |
| 5,350,664 A | 9/1994 | Simons | | 430/362 |
| 5,357,307 A | 10/1994 | Glanville et al. | | 354/324 |
| 5,360,701 A | 11/1994 | Elton et al. | | 430/501 |
| 5,371,542 A | 12/1994 | Pauli et al. | | 348/262 |
| 5,391,443 A | 2/1995 | Simons et al. | | 430/21 |
| 5,414,779 A | 5/1995 | Mitch | | 382/199 |
| 5,416,550 A | 5/1995 | Skye et al. | | 354/298 |
| 5,418,119 A | 5/1995 | Simons | | 430/507 |
| 5,418,597 A | 5/1995 | Lahcanski et al. | | 355/76 |
| 5,432,579 A | 7/1995 | Tokuda | | 354/293 |
| 5,436,738 A | 7/1995 | Manico | | 358/503 |
| 5,440,365 A | 8/1995 | Gates et al. | | 354/298 |
| 5,447,811 A | 9/1995 | Buhr et al. | | 430/20 |
| 5,448,380 A | 9/1995 | Park | | 358/520 |
| 5,452,018 A | 9/1995 | Capitant et al. | | 348/651 |
| 5,465,155 A | 11/1995 | Edgar | | 358/500 |
| 5,477,345 A | 12/1995 | Tse | | 358/500 |
| 5,496,669 A | 3/1996 | Pforr et al. | | 430/22 |
| 5,516,608 A | 5/1996 | Hobbs et al. | | 430/30 |
| 5,519,510 A | 5/1996 | Edgar | | 358/471 |
| 5,546,477 A | 8/1996 | Knowles et al. | | 382/242 |
| 5,550,566 A | 8/1996 | Hodgson et al. | | 345/202 |
| 5,552,904 A | 9/1996 | Ryoo et al. | | 358/518 |
| 5,563,717 A | 10/1996 | Koeng et al. | | 358/406 |
| 5,568,270 A | 10/1996 | Endo | | 358/298 |
| 5,576,836 A | 11/1996 | Sano et al. | | 358/302 |
| 5,581,376 A | 12/1996 | Harrington | | 358/518 |
| 5,587,752 A | 12/1996 | Petruchik | | 396/315 |
| 5,596,415 A | 1/1997 | Cosgrove et al. | | 358/296 |
| 5,627,016 A | 5/1997 | Manico | | 430/434 |
| 5,649,260 A | 7/1997 | Wheeler et al. | | 396/569 |
| 5,664,253 A | 9/1997 | Meyers | | 396/603 |
| 5,664,255 A | 9/1997 | Wen | | 396/627 |
| 5,667,944 A | 9/1997 | Reem et al. | | 430/359 |
| 5,678,116 A | 10/1997 | Sugimoto et al. | | 396/611 |
| 5,691,118 A | 11/1997 | Haye | | 430/357 |
| 5,695,914 A | 12/1997 | Simon et al. | | 430/379 |
| 5,698,382 A | 12/1997 | Nakahanada et al. | | 430/418 |
| 5,726,773 A | 3/1998 | Mehlo et al. | | 358/474 |
| 5,739,897 A | 4/1998 | Frick et al. | | 355/40 |
| 5,771,107 A | 6/1998 | Fujimoto et al. | | 358/464 |
| 5,790,277 A * | 8/1998 | Edgar | | 358/474 |
| 5,835,795 A | 11/1998 | Craig et al. | | 396/6 |
| 5,835,811 A | 11/1998 | Tsumura | | 396/598 |
| 5,870,172 A | 2/1999 | Blume | | 355/27 |
| 5,880,819 A | 3/1999 | Tanaka et al. | | 355/75 |
| 5,892,595 A | 4/1999 | Yamakawa et al. | | 358/530 |
| 5,930,388 A | 7/1999 | Murakami et al. | | 382/167 |
| 5,959,720 A | 9/1999 | Kwon et al. | | 355/38 |
| 5,963,662 A | 10/1999 | Vachtsevanos et al. | | 382/150 |
| 5,966,465 A | 10/1999 | Keith et al. | | 382/232 |
| 5,979,011 A | 11/1999 | Miyawaki et al. | | 15/308 |
| 5,982,936 A | 11/1999 | Tucker et al. | | 382/233 |
| 5,982,937 A | 11/1999 | Accad | | 382/239 |
| 5,982,941 A | 11/1999 | Loveridge et al. | | 382/260 |
| 5,982,951 A | 11/1999 | Katayama et al. | | 382/284 |
| 5,988,896 A | 11/1999 | Edgar | | 396/604 |
| 5,991,444 A | 11/1999 | Burt et al. | | 382/232 |
| 5,998,109 A | 12/1999 | Hirabayashi | | 430/434 |
| 6,000,284 A | 12/1999 | Shin et al. | | 73/150 |
| 6,005,987 A | 12/1999 | Nakamura et al. | | 382/294 |
| 6,017,688 A * | 1/2000 | Edgar | | 430/427 |
| 6,065,824 A | 5/2000 | Bullock et al. | | 347/19 |
| 6,069,714 A | 5/2000 | Edgar | | 358/487 |
| 6,088,084 A | 7/2000 | Nishio | | 355/75 |
| 6,089,687 A | 7/2000 | Helterline | | 347/7 |
| 6,101,273 A | 8/2000 | Matama | | 382/169 |
| 6,102,508 A | 8/2000 | Cowger | | 347/7 |
| 6,137,965 A | 10/2000 | Burgeios et al. | | 396/626 |
| 6,200,738 B1 | 3/2001 | Takano et al. | | 430/362 |

FOREIGN PATENT DOCUMENTS

| | | | | |
|---|---|---|---|---|
| EP | 0 525 886 A3 | 7/1992 | | G03D/5/00 |
| EP | 0 580 293 A1 | 6/1993 | | H04N/1/04 |
| EP | 0 601 364 A1 | 6/1994 | | H04N/1/387 |
| EP | 0 669 753 A2 | 2/1995 | | H04N/1/407 |
| EP | 0 794 454 A2 | 2/1997 | | G03B/27/73 |
| EP | 0 768 571 A2 | 4/1997 | | G03D/13/00 |
| EP | 0 806 861 A1 | 11/1997 | | H04N/1/00 |
| EP | 0 878 777 A2 | 11/1998 | | G06T/5/40 |
| EP | 0 930 498 A2 | 12/1998 | | G01N/21/88 |
| WO | WO 90/01240 | 2/1990 | | H04N/1/40 |
| WO | WO 91/09493 | 6/1991 | | H04N/5/217 |
| WO | WO 97/25652 | 7/1997 | | G03D/5/00 |
| WO | WO 98/19216 | 5/1998 | | G03C/5/29 |
| WO | WO 98/25399 | 6/1998 | | H04N/1/38 |
| WO | WO 98/31142 | 7/1998 | | H04N/5/253 |
| WO | WO 98/34157 | 8/1998 | | |
| WO | WO 98/34397 | 8/1998 | | |
| WO | WO 99/43148 | 8/1999 | | H04N/1/00 |
| WO | WO 99/43149 | 8/1999 | | H04N/1/100 |
| WO | WO 01/01197 | 1/2001 | | G03D/5/00 |
| WO | WO 01/13174 A1 | 2/2001 | | G03D/5/06 |
| WO | WO 01/45042 A1 | 6/2001 | | G06T/5/00 |
| WO | WO 01/50192 A1 | 7/2001 | | G03C/7/407 |
| WO | WO 01/50193 A1 | 7/2001 | | G03C/7/407 |
| WO | WO 01/50194 A1 | 7/2001 | | G03C/7/407 |
| WO | WO 01/50197 A1 | 7/2001 | | G03C/7/42 |
| WO | WO 01/52556 A2 | 7/2001 | | H04N/9/11 |

OTHER PUBLICATIONS

"Anisotropic Spectral Magnitude Estimation Filters for Noise Reduction and Image Enhancement", Aich T., et al., Philips GmbH Research Laboratories, IEEE, pp. 335–338, 1996.

"Adaptive–neighborhood filtering of images corrupted by signal–dependent noise", Rangayyan, R., et al., Applied Optics, vol. 37, No. 20, pp. 4477–4487, Jul. 10, 1998.

"Grayscale Characteristics", The Nature of Color Images, Photographic Negatives, pp. 163–168.

"Parallel Production of Oligonucleotide Arrays Using Membranes and Reagent Jet Printing", Stimpson, D., et al., Research Reports, BioTechniques, vol. 25, No. 5, pp. 886–890, 1998.

"Low–Cost Display Assembly and Interconnect Using Ink–Jet Printing Technology", Hayes, D. et al., Display Works '99, MicroFab Technologies, Inc., pp. 1–4, 1999.

"Ink–Jet Based Fluid Microdispensing in Biochemical Applications", Wallace, D., MicroFab Technologies, Inc., Laboratory Automation News, vol. 1, No. 5, pp. 6–9, Nov., 1996.

"Protorealistic Ink–Jet Printing Through Dynamic Spot Size Control", Wallace, D., Journal of Imaging Science and Technology, vol. 40, No. 5, pp. 390–395, Sep./Oct. 1996.

"MicroJet Printing of Solder and Polymers for Multi–Chip Modules and Chip–Scale Package", Hayes, D., et al., Micro-Fab Technologies, Inc.

"A Method of Characterisstics Model of a Drop–on–Demand Ink–Jet Device Using an Integral Method Drop Formation Model", Wallace, D., MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikonusa.com/reference/whitepapers/imaging, Nikon Corporation, Nov. 28, 2000.

* cited by examiner

METHOD AND SYSTEM FOR CAPTURING FILM IMAGES

RELATED APPLICATIONS

This application claims priority under 35 U.S.C. §119(e) of U.S. Provisional Patent Application No. 60/180,477, entitled Method and System for Capturing Film Images, and having a filing date of Feb. 3, 2000.

This application is related to the following copending U.S. Patent Applications: System and Method for Digital Film Development Using Visible Light, Ser. No. 60/174,055, and having a priority filing date of Dec. 30, 1999; Improved System and Method for Digital Film Development Using Visible Light, Ser. No. 09/751,378, and having a priority filing date of Dec. 30, 1999; Scanning Apparatus and Digital Film Processing Method, Ser. No. 09/751,403, and having a priority filing date of Dec. 30, 1999; and System and Method for Digital Dye Color Film Processing, Ser. No. 09/751,473.

FIELD OF THE INVENTION

The present invention relates generally to developing and capturing film images, and more particularly to using improved film development techniques to prepare a film for electronic image capture.

BACKGROUND OF THE INVENTION

People are continually seeking new and improved methods for creating, recreating, and displaying images. As a result of these efforts, images that would take a talented painter weeks, months, or even years to create can now be created within seconds, minutes or hours. With the advent of the computer, and all of the improvements that quickly followed, images can now be recorded and recreated electronically. Even so, the search for better ways to produce and reproduce images continues.

A common method of producing and reproducing an image involves the use a color photographic film. A camera is used to properly expose a photographic film to light. Different wavelengths of light (namely light in the red, blue and green portions of the visible spectrum) react with chemicals (e.g. silver halide) coated in different film layers, thereby forming a latent image primarily in the red-sensitive layer that includes image information from the red wavelengths, a blue-sensitive layer that includes primarily information from the blue wavelengths, and a green-sensitive layer containing primarily information from the green wavelengths of the spectrum. The film is then subjected to a developing process in which developed silver images are generated, and appropriately colored image dyes are produced in each film layer. Typically, after the dye images are produced, the developed silver image is converted back to silver halide using another chemical solution. Finally, the silver halide is removed with yet another chemical solution leaving only the dye images.

A scanner, such as a red-green-blue (RGB) scanner, may then be employed to capture the photographic image which is present in the film. For example, a photograph can be scanned, and an electronic representation of the image (a captured image) can be generated and stored. The captured image may be reproduced without alteration, or image processing techniques can be used to enhance or modify the captured image.

Methods of film processing and image capturing, such as those just described, are in common use, and can be effective in some instances. However, a method that required fewer steps, or fewer chemicals to carry out those steps, would be advantageous.

SUMMARY OF THE INVENTION

Therefore, what is needed is an improved method of creating and reproducing a photographic image. Accordingly, the present invention provides a method of capturing film images comprising applying a monobath solution to a film and scanning the coated film to capture an electronic representation of a developed image. The monobath solution forms at least one dye image by developing a latent image present in the film. The monobath solution includes multiple processing agents. In one embodiment, the monobath solution comprises a developing agent and a fixing agent. In another embodiment, the monobath solution comprises a developing agent and a stabilizing agent. In another embodiment of the present invention, a system for processing undeveloped film is provided. In this embodiment, the system comprises an applicator, at least one image recording station, and a data processing system. The applicator operates to apply a monobath solution to the film. The monobath solution operates to produce a developed image within the film. The image recording station operates to scan the developed image within the coated film and produce a sensor data. The data processing system operates to receive the sensor data and output a digital image to an output device. The output device may comprise a printer, memory storage device, data network, the Internet, or any other suitable output device.

An advantage of at least one embodiment of the present invention is that smaller quantities of chemicals are needed to prepare a film for scanning. In particular, the monobath solution and any processing solutions, as well as any silver compounds within the film are not removed from the film.

An advantage of at least one embodiment of the present invention over some digital film processing methods is a reduction in noise due to crosstalk between color channels. A further advantage of an embodiment of the present invention over some digital film processing methods is that the present invention is not affected as much by high-density antihalation layers in film.

An additional advantage of some embodiments of the present invention over some digital film processing methods is that the present invention uses part of the films normal development process so that more dynamic range in a films blue and red layers is allowed, infra-red and/or visible illuminators will not fog the film, grain noise can be reduced, and color correction and grain noise can be improved.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE INVENTION

In the following detailed description of one embodiment of the invention, reference is made to the accompanying drawings, which form a part hereof, and in which is shown by way of illustration and are not intended to limit the scope or application of the invention. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
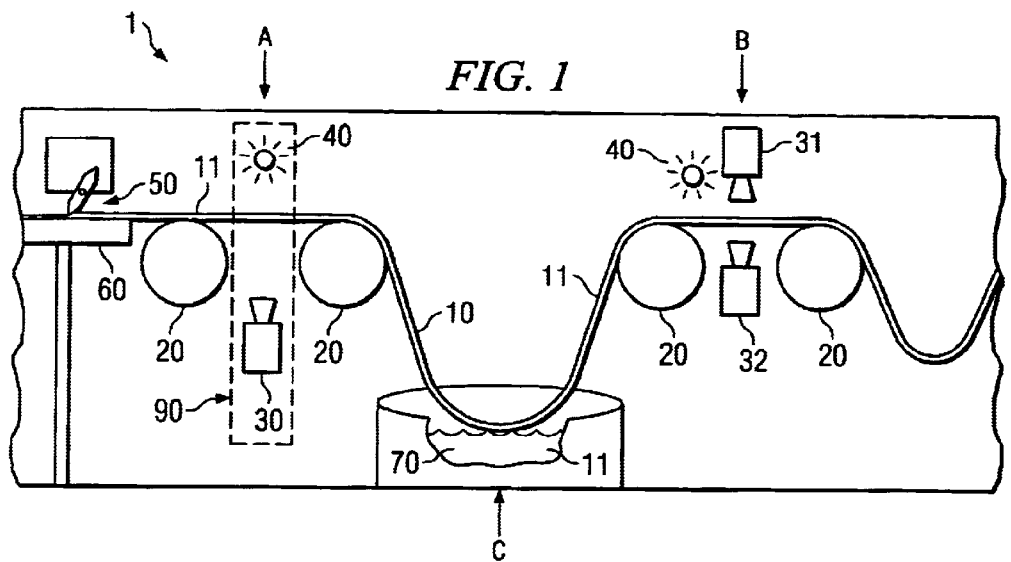
FIG. 1 is a diagram of a combination film processing and image capturing system according to at least one embodiment of the present invention.

Referring first to FIG. 1, a section of a film processing system is illustrated according to one embodiment of the present invention, and designated generally by reference numeral 1. System 1 comprises table 60, rollers 20, cameras 30, 31, and 32, illumination sources 40, and extruder 50. An illumination source 40 and a corresponding illumination detector, such as camera 30, are sometimes referred to as an image recording station 90. All of these elements cooperate to develop film 10 and capture images before, during or after the development period.

Table 60 is provided as a support for film 10, and facilitates an even distribution of a monobath solution 11 dispensed by extruder 50. In a preferred embodiment extruder 50 extrudes a viscous monobath solution 11 onto film 10. Rollers 20 move film 10 through system 1. Cameras 30, 31 and 32, and illumination sources 40 are positioned at appropriate locations along the path of film 10 to capture images during various stages of development. In one embodiment, illumination sources 40 are infrared illumination sources capable of providing infra-red (IR) light for use with IR sensitive detectors, such as cameras 30, 31 and 32. Alternatively, illumination sources 40 may be white light or red-green-blue (RGB) sources configured for use with (RGB) sensors. Cameras 30, 31 and 32 may be positioned to record images using reflected light, transmitted light, or a combination of reflected and transmitted light provided by illumination sources 40. The speed at which various portions of film 10 are moved through system 1 may be varied. For example, in FIG. 1, film 10 is moving faster at point A, and slower at point B. The difference in speed is compensated for by allowing film 10 to form a loop at point C.

In one embodiment, a loop such as the one shown at point C is used to immerse film 10 in chemical bath 70. In at least one embodiment, chemical bath 70 may be used in place of (or in addition to) applying monobath solution 11 using extruder 50. It should also be noted that while a single extruder 50 is shown in FIG. 1, multiple extruders may be used to coat film 10 with additional processing solutions such as a fixer, bleach, stabilizer, and the like, or multiple processing solutions may be dispensed from a single extruder 50. In addition, different chemical agents forming the monobath solution 11 may be combined in a chamber within the extruder 50 just prior to the application of the monobath solution 11 onto the film 10. It will be appreciated that the monobath solution 11 may be applied to film 10 using methods other than those discussed, without departing from the spirit and scope of the present invention. Although a film processing system is illustrated in FIG. 1, those skilled in the art will appreciate that the present invention may be practiced using other systems.

Figure 1A:
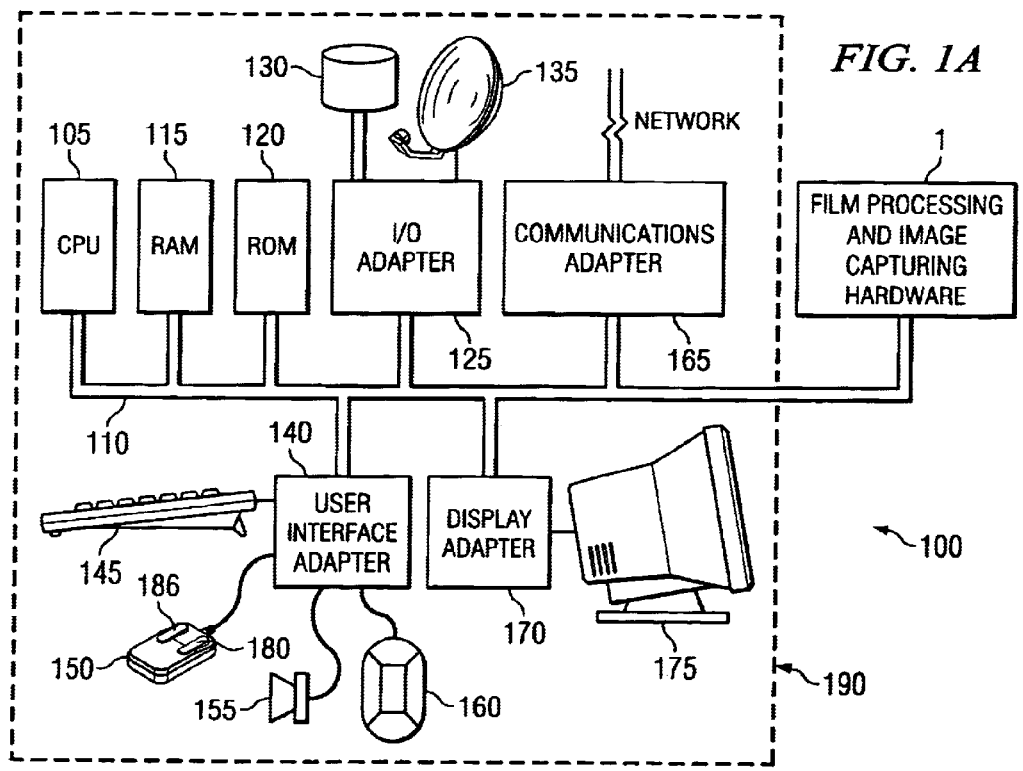
FIG. 1A is a block diagram of an image capturing system that includes both an information handling system and a combined film processing and image capturing system according to one embodiment of the present invention.

Referring next to FIG. 1A, an image capturing system is depicted, and designated generally by reference numeral 100. The illustrated embodiment of image capturing system 100 is comprised of information handling system 190 and film processing system 1. Information handling system 190 preferably comprises a central processing unit 105, such as a conventional microprocessor, and a number of other units interconnected via at least one system bus 110. In one embodiment, information handling system 190 and film processing system 1 are separate systems interconnected for functionality. For example, information handling system 190 may be a desktop computer, and film processing system 1 may be a film processing system similar to the one illustrated in FIG. 1. In this example, the film processing system 1 is configured to depend upon information handling system 190 for image processing and control functions. In another embodiment, information handling system 190 and film processing system 1 are part of a single physical unit.

One embodiment of an information handling system 190 is shown in FIG. 1A. In this embodiment, information handling system 190 is shown as an integral part of image capturing system 100, and includes random access memory (RAM) 115, read-only memory (ROM) 120 wherein the ROM 120 could also be erasable programmable read-only memory (EPROM) or electrically erasable programmable read-only memory (EEPROM), and input/output (I/O) adapter 125 for connecting peripheral devices such as a printer, disk units 130 and tape drives 135 to system bus 110, a user interface adapter 140 for connecting keyboard 145, mouse 150, speaker 155, microphone 160, and/or other user interface devices to system bus 110, communications adapter 165 for connecting information handling system 190 to an information network such as the Internet, and display adapter 170 for connecting system bus 110 to a display device such as monitor 175. Mouse 150 has a series of buttons 180, 185 and is used to control a cursor shown on monitor 175. Image capturing system 100 includes both information handling system 190, and film processing system 1. It will be understood that information handling system 190 may comprise other suitable sub-systems and peripherals without departing from the scope of the present invention.

Figure 2:
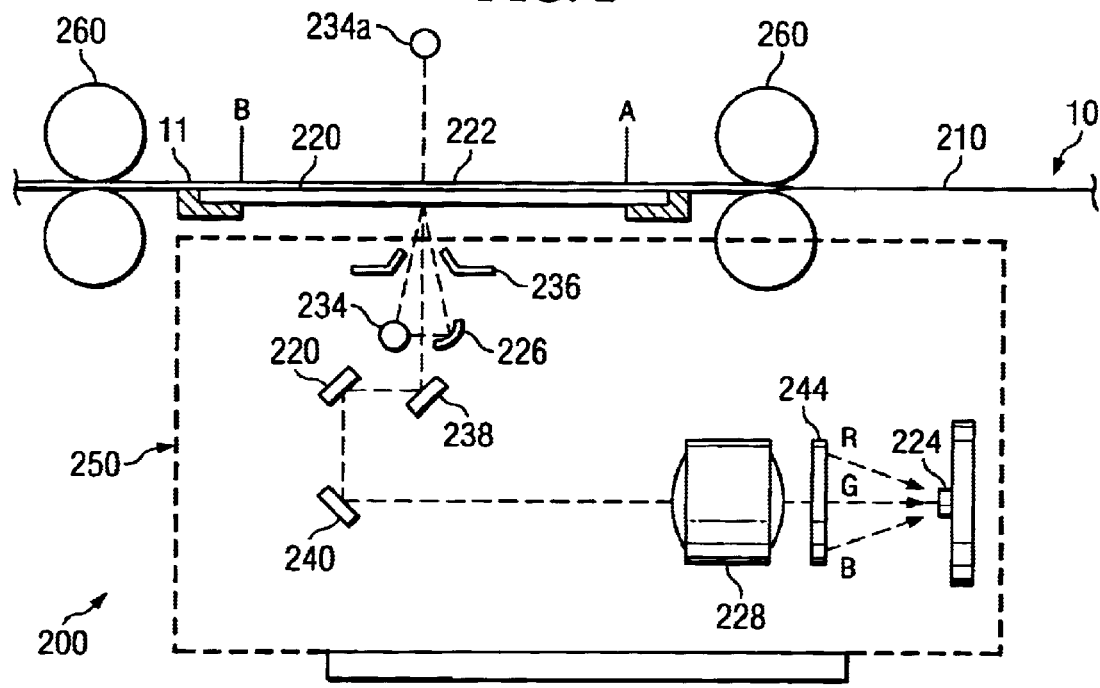
FIG. 2 is a schematic view of a red-blue-green RGB image recording station according to a preferred embodiment of the present invention.

Referring next to FIG. 2, an image recording station 90 is illustrated according to one embodiment of the present invention. The image recording station 90 uses electromagnetic radiation, i.e., light, to scan the developed image on the film 10 into a digitized representation of the image. As described above, the image recording station 90 may utilize different types, or colors, of light to illuminate the film 10. In particular, different colors of light interact differently with the film 10. Visible light interacts with the dyes and silver within the film 10. Whereas, infrared light interacts with the silver, but the dyes are generally transparent to infrared light. The term "color" is used to generally describe specific frequency bands of electromagnetic radiation, including visible and non-visible light. Visible light, as used herein, means electromagnetic radiation having a frequency or frequency band generally within the electromagnetic spectrum of near infrared light (>700 nm) to near ultraviolet light (<400 nm). Visible light can be separated into specific bandwidths. For example, the color red is generally associated with light within a frequency band of approximately 600 nm to 700 nm, the color green is generally associated with light within a frequency band of approximately 500 nm to 600 nm, and the color blue is generally associated with light within a frequency band of approximately 400 nm to 500 nm. Near infrared light is generally associated with radiation within a frequency band of approximately 700 nm to 1500 nm. Although specific colors and frequency bands are described herein, the film 10 may be scanned with other suitable colors and frequency ranges without departing from the spirit and scope of the invention.

In one embodiment, the image recording station 90 incorporates a transparent platen 220 over which a film having a developed image 222 to be captured is located. Although transparent platen 220 is used in the illustrated embodiment, it will be appreciated that a platen is not necessary for implementing the present invention. For example, pressure rollers 260 can be configured to hold film 10 taught. In one implementation, one or more photosensitive arrays 224 are supported for reciprocating scanning movement below platen 220. In yet another implementation, additional photosensitive arrays (not shown for ease of illustration) may be positioned above and below platen 220, and may or may not be configured to move along with platen 220. A scanning system assembly 250 includes several optical components, which may move together as a single unit. In one embodiment, the scanning system assembly 250 includes a lamp 234, an associated reflector 226 and a baffle 236, with the latter two elements cooperating to direct a narrow band of light onto a small area across the platen 220. Also included in the assembly 250 are lens 228, and mirrors 230,238 and 240, which operate together to focus the light band onto the platen 220 and the document being scanned thereon, through color sensor 244, where light from the light band is filtered into separate color sources, and onto array 224. Array 224 produces electrical image signals representative of image 222. These signals may be output to disk units 130, tape units 135, RAM 115, display adapter 170 for display on display unit 175, a printer, or to another device coupled to information handling system 190 via a network for image processing.

Illumination source 234a is preferably also included with scanning assembly 250. Illumination source 234a is used in a similar manner to lamp 234, except that illumination source 234a is positioned to illuminate the back of film 10 containing image 222. By illuminating the back of film 10, illumination source 234a provides a source of transmitted light that can be used in accordance with the principles of the present invention to record an image. As previously mentioned, additional photosensitive arrays (not shown) may be positioned above platen 220 to receive light transmitted through film 10 containing developed image 222. Various arrangements of illumination sources and detectors that permit measurements to be made using reflected light, transmitted light, or both, can be implemented according to the present invention. Upon consideration of the remainder of this discussion, it will become apparent that the present invention can be implemented using a single illumination source and detector, or multiple illumination sources and/or detectors.

Scanning array 224 may be a linear array of photosensitive sensors such as charge coupled devices, photo-diodes, complementary metal-oxide semiconductor (CMOS) devices, or any suitable photo detector that operates to sense light reflected from or transmitted through the film 10 containing developed image 222 during the illumination period. The photosensitive sensors produce an electrical signal indicative of the amount of light sensed. This electrical signal may be output for use by CPU 105 in assimilating an electronically stored representation of developed image 222, or measurement of an attribute of developed image 222 such as image density. Scanning array 224 generally extends in a direction transverse to that of the motion of scanning system assembly 250. This enables scanning system assembly 250 to move along an axis known to those skilled in the art as the "slow scan" axis, which begins at one end of developed image 222 and extends in the process direction towards the opposite end. The direction across the page in which the array extends is known as the fast scan axis.

It will be appreciated that movement of scanning system assembly 250 is described relative to film 10 being scanned, and that film 10 may be moved rather than the scanning assembly. In a preferred embodiment of the present invention, scanning system assembly 250 remains fixed in place, and pressure rollers 260 cooperate to move a portion of film 10 into a recording position. In a recording position, the developed image 222 present on film 10 is preferably located between illumination source 234a and baffle 236, so that light is transmitted through film 10, and detected by scanning array 224.

It will also be appreciated, that while an RGB recording station 90 is illustrated, similar recording stations, employing illumination sources capable of providing various frequencies of light along with corresponding detectors, maybe used consistent with the present invention. In particular, infrared light may be used to scan the in-situ silver and/or silver halide within the film 10. The data on the in-situ silver and/or silver halide can be used to compensate for the silver within the film 10.

Figure 3:
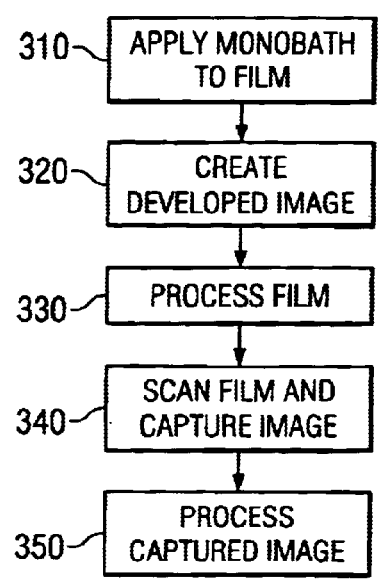
FIG. 3 is a flowchart illustrating a method according to one embodiment of the present invention.

Referring next to FIG. 3, a flow chart according to one embodiment of the present invention is shown. The illustrated method begins at application step 310, and presupposes a film having a latent photographic image formed thereon. In application step 310 a monobath solution 11 is applied to the film. The term "monobath solution" is used to refer to a combination chemical solution capable of simultaneously developing the film and otherwise processing the film. In other words, the monobath solution 11 is a functional blend of a developer solution and another processing solution. For example, in one embodiment, the monobath solution 11 comprises a developing agent (develops the film 10) and a fixing agent (dissolves silver halide within the film 10). In another embodiment, the monobath solution 11 comprises a developing agent and a stabilizing agent (reduces a films sensitivity to light). In yet another embodiment, the monobath solution 11 comprises a developing agent and a bleaching agent (oxidizes in-situ silver within the film 10). In yet another embodiment, the monobath solution 11 comprises a developing agent and a blix agent (functions as a bleaching agent and a fixing agent). Although specific embodiments of the monobath solution 11 are described, other suitable functions may be incorporated into the monobath solution. In addition, while "monobath" may connote a chemical bath, the term as used herein is not limited to this particular connotation. In particular, a monobath solution 11 is preferably a viscous liquid for extrusion onto the film 10. Alternatively, a monobath solution 11 may be sprayed onto the film 10, or otherwise made to coat the film 10.

Development step 320 and processing step 330 are simultaneously performed by a reaction of the monobath solution applied in step 310 with chemicals on the film 10. In development step 320, a developed image 222 is produced from a latent image present in a film 10. In the case of a simple color film, there is a latent image formed in each of three basic film layers. Each of these layers is comprised of an emulsion that reacts primarily to light in the red, blue or green portion of the visible spectrum. As a result, each layer will contain a latent image representing one of these three color channels. When a color developing chemical is applied to the film, a specific color of dye (cyan, yellow, or magenta), or dye image, in each emulsion layer forms the developed image. In addition to these dye images, a developed silver image is also formed in each layer.

Processing step 330 modifies the development process of the film 10. In one embodiment, the monobath solution 11 includes a bleaching agent. In this embodiment of processing step 330, as the silver image and dye image is produced in each film layer, the bleaching agent reacts with the in-situ silver to produce silver halide. In another embodiment, the monobath solution 11 includes a fixing agent. In this embodiment of processing step 330, the fixing agent dissolves the silver halide within the film 10 to produce a silver compound that is substantially transparent to light. In another embodiment, the monobath solution 11 includes a stabilizing agent. In this embodiment of processing step 330, the stabilizing agent desensitizes the silver halide to light. In other embodiments, the monobath solution 11 may comprise multiple chemical agents described above, or other such chemical agents for suitably modifying the development process. Recall that both development step 320 and processing step 330 are preferably performed by chemical agents deposited in step 310. However, other embodiments exist in which a second application step (not shown) is performed between developing step 320 and processing step 330, and the monobath solution 11 applied during step 310 forms a dye by developing the latent image, and the second application step modifies the development of the film 10.

The method proceeds to scanning step 340, wherein the film 10 is scanned, and an electronic representation of the image on the film 10 is recorded. One method of capturing an image is provided in the discussion of FIGS. 1 and 2. While the method illustrated in FIG. 3 shows scanning step 340 being performed after steps 320 and 330, one embodiment of the present invention provides for multiple scanning steps at various stages during the development of the film 10. To enable images to be recorded before the film 10 is stabilized, a frequency of light that does not cause significant film exposure, such as infra-red (IR) light may be used.

Lastly, the method proceeds to data processing step 350. Data processing step 350 is preferably performed by a program of instructions running on an information handling system such as the one shown in FIG. 1a. The developed image, which is captured in scanning step 340, is a composite image of the dye images (red, blue and green color channel images), and the developed in-situ silver image. The developed in-situ silver image is not part of the desired film image. Ideally, processing step 350 removes the part of the captured image corresponding to the developed in-situ silver image, leaving only the red, green and blue image channels.

In practice, the developed in-situ silver image is commonly perceived as desaturating the dye images (i.e. making the color in each channel less vivid). One method of correcting this desaturation (in effect removing the part of the captured image corresponding to the developed silver image) is to reconstruct the original color channels by altering each of the electronic representations of the color channels to increase their color saturation levels. Since each portion of the captured (recorded) image represents a corresponding portion of the original film image as a numerical value, the saturation of the recorded image can be altered using mathematical transforms already commonly used for image processing.

It will be appreciated by those skilled in the art, that the present invention may benefit from a process called reduction-oxidation (redox) amplification. Redox amplification essentially "recycles" the image silver contained in a films emulsion layers to produce much more than the expected amount of image dye. By using redox amplification with a film having a low silver halide content, the effects of the unremoved, developed silver image can be minimized, thereby decreasing the level of saturation change that is needed to accurately reconstruct the color channel images. In one embodiment, redox amplification can be used in combination with a monobath solution. In another embodiment, redox amplification may be used in conjunction with separately applied developing and fixing agents. Yet another embodiment performs redox amplification with a developing solution only (i.e. no fixer or stabilizing solution). By using redox amplification coupled with a low silver halide coverage film, coupling and stabilization may be accomplished in a single step.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method of developing and scanning a film comprising:
   coating solely a monobath solution onto the film that operates to produce a developed image within the film, wherein the monobath solution comprises a combination of a developing agent and at least one processing agent; and
   scanning the coated film to capture an electronic representation of the developed image.

2. The method of claim 1, wherein the at least one processing agent includes a fixing agent.

3. The method of claim 1, wherein the at least one processing agent includes a stabilizing agent.

4. The method of claim 1, wherein the at least one processing agent includes a bleaching agent.

5. The method of claim 1, wherein the at least one processing agent includes a blix agent.

6. The method of claim 1, wherein the at least one processing agent includes a redox amplification agent.

7. The method of claim 1, wherein scanning the coated film comprises scanning the coated film with visible and infrared light.

8. The method of claim 1, wherein scanning the coated film comprises scanning the coated film with infrared light.

9. The method of claim 1, wherein scanning the coated film comprises scanning the coated film with visible light.

10. The method of claim 1, wherein scanning includes illuminating the coated film with an illumination source, and wherein the electronic representation of the developed image is captured using red-green-blue (RGB) sensors.

11. The method of claim 1, wherein scanning includes illuminating the coated film with an illumination source, and wherein the electronic representation of the image is captured using infra-red (IR) detectors.

12. The method as in claim 1, wherein scanning is performed at a plurality of stages during development of the film.

13. The method of claim 1, wherein scanning the coated film is performed while the film is still wet with the monobath solution.

14. The method of claim 1, wherein the developed image comprises one or more dye images and in-situ silver.

15. The method of claim 1, wherein the developed image comprises one or more dye images.

16. The method of claim 1, further comprising outputting the electronic representation of the developed image to an output device.

17. A system for processing undeveloped film comprising:
   an applicator operable to apply a monobath solution to the film, wherein the monobath solution operates to develop an image within the film and modify the developed film; and
   at least one image recording station operable to scan the developed image within the coated film and produce a sensor data; and
   a data processing system operable to receive the sensor data and output a digital image to an output device, data storage device, or data network.

18. The system of claim 17, wherein the monobath solution comprises a developing agent and a stabilizing agent.

19. The system of claim 17, wherein the monobath solution comprises a developing agent and a bleaching agent.

20. The system of claim 17, wherein the monobath solution comprises a developing agent and a fixing agent.

21. The system of claim 17, wherein the monobath solution comprises a developing agent and a blix agent.

22. The system of claim 17, wherein the monobath solution comprises a developing agent and a redox amplification agent.

23. The system of claim 17, wherein the output device comprises a printer.

24. The system of claim 17, wherein the data network comprises a worldwide data communication network.

25. The system of claim 17, wherein at least one image recording station scans the developed image with visible light.

26. The system of claim 17, wherein at least one image recording station scans the developed image with infrared light.

27. The system of claim 17, wherein at least one image recording station scans the developed image with visible light and infrared light.

28. The system of claim 17, further comprising a second applicator operable to apply a processing solution to the film after the image is produced.

29. The system of claim 28, wherein the processing solution comprises a bleach solution.

30. The system of claim 28, wherein the processing solution includes a redox amplification solution.

31. The system of claim 17, wherein the applicator comprises an extruder.

32. The system of claim 17, wherein the applicator comprises a chemical bath.

33. The system of claim 17, further comprising a machine-human interface, wherein the machine-human interface operates to accept user input, and a program of instructions operate to alter the digital image according to the user input.

* * * * *